United States Patent [19]

Durrenberg

[11] Patent Number: 4,962,424
[45] Date of Patent: Oct. 9, 1990

[54] VIDEO AIRDROP SIGHT APPARATUS

[75] Inventor: Richard O. Durrenberg, Vacaville, Calif.

[73] Assignee: The United States of America as represented by the Secretary of the Air Force, Washington, D.C.

[21] Appl. No.: 322,317

[22] Filed: Mar. 10, 1989

[51] Int. Cl.$^5$ .............................................. H04N 7/18
[52] U.S. Cl. ...................................... 358/103; 358/109
[58] Field of Search .................. 358/109, 125, 93, 87, 358/903; 89/1.61

[56] References Cited

U.S. PATENT DOCUMENTS

| | | | |
|---|---|---|---|
| 3,742,812 | 7/1973 | Woodworth et al. | 89/1.5 E |
| 3,886,306 | 5/1975 | Fayard et al. | 358/109 X |
| 4,015,905 | 4/1977 | Lloyd | 356/248 |
| 4,121,246 | 10/1978 | Fadden et al. | 358/103 |
| 4,218,702 | 8/1980 | Brocard et al. | 358/109 |
| 4,404,592 | 9/1983 | Pepin et al. | 358/109 X |
| 4,647,967 | 3/1987 | Kirshner et al. | 358/109 |

*Primary Examiner*—James J. Groody
*Assistant Examiner*—Victor R. Kostak
*Attorney, Agent, or Firm*—William Stepanishen; Donald J. Singer

[57] ABSTRACT

A video airdrop sight apparatus having a video camera which is mounted on a gyro-stabilizes gimbal structure for correction about the pitch and roll axis. The video camera which is positioned in the bottom of a cargo plane provides video signals to a monitor in the flight deck. Calibrated markings on the monitor screen indicate cargo airdrop release points to the flight crew.

3 Claims, 2 Drawing Sheets

VIDEO AIRDROP SIGHT APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a sight apparatus, and in particular a video airdrop sight apparatus.

The state of the art of target sighting apparatus is well represented and alleviated to some degree by the prior art apparatus and approaches which are contained in the following U.S. Pat. Nos. 3,742,812 issued to Woodworth et al. on Jul. 3, 1973; and 4,015,905 issued to Lloyd on Apr. 5, 1977.

The Woodworth et al patent describes a method of aiming a gyrostabilized television guided missile from an aircraft at a ground target. The pilot places the desired target within the gunsight of his aircraft, confirms in his cockpit monitor that the target is indeed within the tracking gate of the missile, then launches the missile.

The Lloyd patent is directed to an improved target sighting device for use on moving vehicles, such as military aircraft, and in which a vertically-disposed C-shaped elevation gimbal is supported for rotary movement about an elevation axis at the center of the gimbal to enable a vertically extending mirror on the gimbal to be aimed toward a target along a line of sight at one side of the gimbal, for reflection of target information along such axis and through the open end of the gimbal to a fixed optical pickup assembly. The improvement resides in the support of the open end of the gimbal by a ring bearing encircled by an annular flex pivot assembly that limits the extent of rotary aim-influencing vibration that can be transmitted from the exterior of the device to the gimbal and mirror circumferentially through the ring bearing by friction.

In the prior art, during visual meteorological conditions (VMC), cargo aircraft were experiencing problems with accurate and precise airdrops of equipment and materials. Part of the problem stems in fact from the inability of flight crews to accurately drop or jettison cargo from the aircraft using solely a visual fix of the computed airdrop release point. Other factors which further complicate the airdrop task, are meteorological conditions (VMC) due to positional errors which accumulate during inertial navigation system (INS) visual position updates, visual fix before timed run-in to computed airdrop release point (CARP), time spent for actual load ejection at CARP, and printing variances in maps used for computing CARP. The present invention provides a stabilized platform and a calibrated viewing means to accurately fix the release points for cargo airdrops.

SUMMARY OF THE INVENTION

The present invention utilizes a video camera which is mounted on a gyro-stabilized gimbal for correction about the pitch and roll axis. The stabilized unit is attached to a metal panel that has a view window therein. The video camera is pointed out the bottom of the cargo plane to provide video signals that represent the cargo airdrop release points. The video signals are provided to a monitor unit which has fixed calibrated markings and is located in the flight deck, to aid the pilot, co pilot, and/or navigator in releasing the airdrop cargo at the appropriate release points.

It is one object of the present invention, therefore, to provide an improved video airdrop sight apparatus.

It is another object of the invention to provide an improved video airdrop sight apparatus wherein flight crews can accurately drop cargo using a visual fix.

It is still another object of the invention to provide an improved video airdrop sight apparatus wherein computed airdrop release points during visual meteorological conditions are clearly located.

It is yet another object of the invention to provide an improved video airdrop sight apparatus wherein a gyrostabilized camera is utilized to visually present airdrop release points.

It is a further object of the invention to provide an improved video airdrop sight apparatus wherein computer airdrop release points are graphically presented to the flight crew.

It is an even further object of the invention to provide an improved video airdrop sight apparatus wherein calibrated markings for cargo release points are presented to the pilot, co-pilot and/or navigator.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
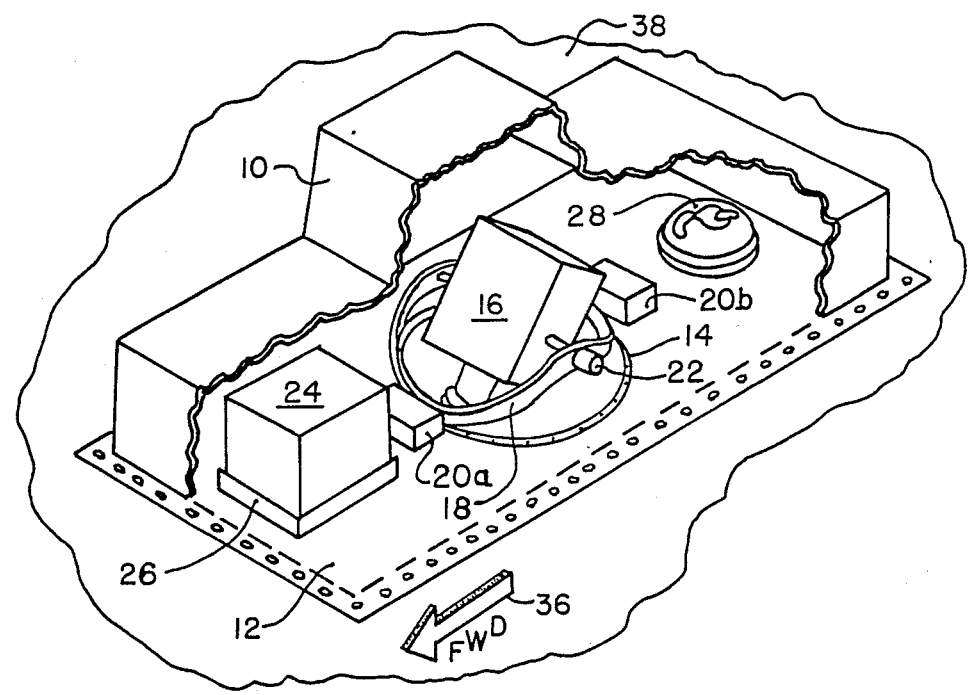
FIG. 1 is a cutaway isometric view of the video airdrop sight apparatus according to the present invention.

Referring now to FIG. 1, there is shown a video airdrop sight apparatus which is located within enclosure structure 10. The enclosure structure is removably attached to the doppler replacement panel 12 by any suitable commercially available attachment method. The doppler replacement panel 12 includes a clear transparent plastic bubble 14 which is located substantially in the center of panel 12. The doppler replacement panel 12 is operatively attached to an aircraft 38. A video camera 16 which is mounted on a gimbal frame 18, is movably positioned within the enclosure 10 and the clear plastic bubble 14. A roll motor/gimbal point unit 20a, and a gimbal point center 20b are operatively connected to the gimbal frame 18 to control the altitude of the video camera 16 with respect to aircraft roll. A pitch drive motor 22 which is mounted on the gimbal frame 18, is operatively connected to the video camera 16 to maintain and control the altitude of the video camera with respect to aircraft pitch. The control amplifier unit 24 is mounted in amplifier mounting unit 26 which is attached to the doppler replacement panel 12. A stabilization gyro unit 28 is operatively attached to the doppler replacement panel 12. The direction of forward motion of the video airdrop sight apparatus is shown by arrow 36.

Airdrop aircraft, such as the C-141, can be fitted with the present video airdrop sight apparatus to indicate an actual drop point on a calibrated display. While the present apparatus is directed to a visual monitor system using a video system, it should be noted that the camera system may also utilize other sensing devices such as infrared, telephoto lens etc. However, for the present discussion, the video airdrop sight apparatus comprises the following: a video camera mounted on a gyro-stabilized gimbal for correction about the pitch and roll axis and attached to a metal panel, approximately braced, that will attach to the aircraft in place of the existing, unused doppler radome panel. The crab and angle of attack attitude can be corrected manually by two additional synchros which may be operatively connected to the video camera stabilization and control circuit. The monitor and controls can be mounted in the navigator's panel using dzus fasteners (see FIG. 3). The monitor screen can be calibrated with graticules which can be used to align camera about the yaw axis and to mark the drop release point, based on altitude, camera pitch angle, and wind. The visual fix can be obtained through the camera system and the cargo drop will arrive on target with only minor variances caused by uncontrollable factors such as change in wind velocity and speed of load ejection. Such a system could be installed on aircraft as required for missions if the wiring is preinstalled. Wiring can be capped off when not in use. This system should also be considered for use on other aircraft involved in airdrops such as C-130s.

Figure 2:
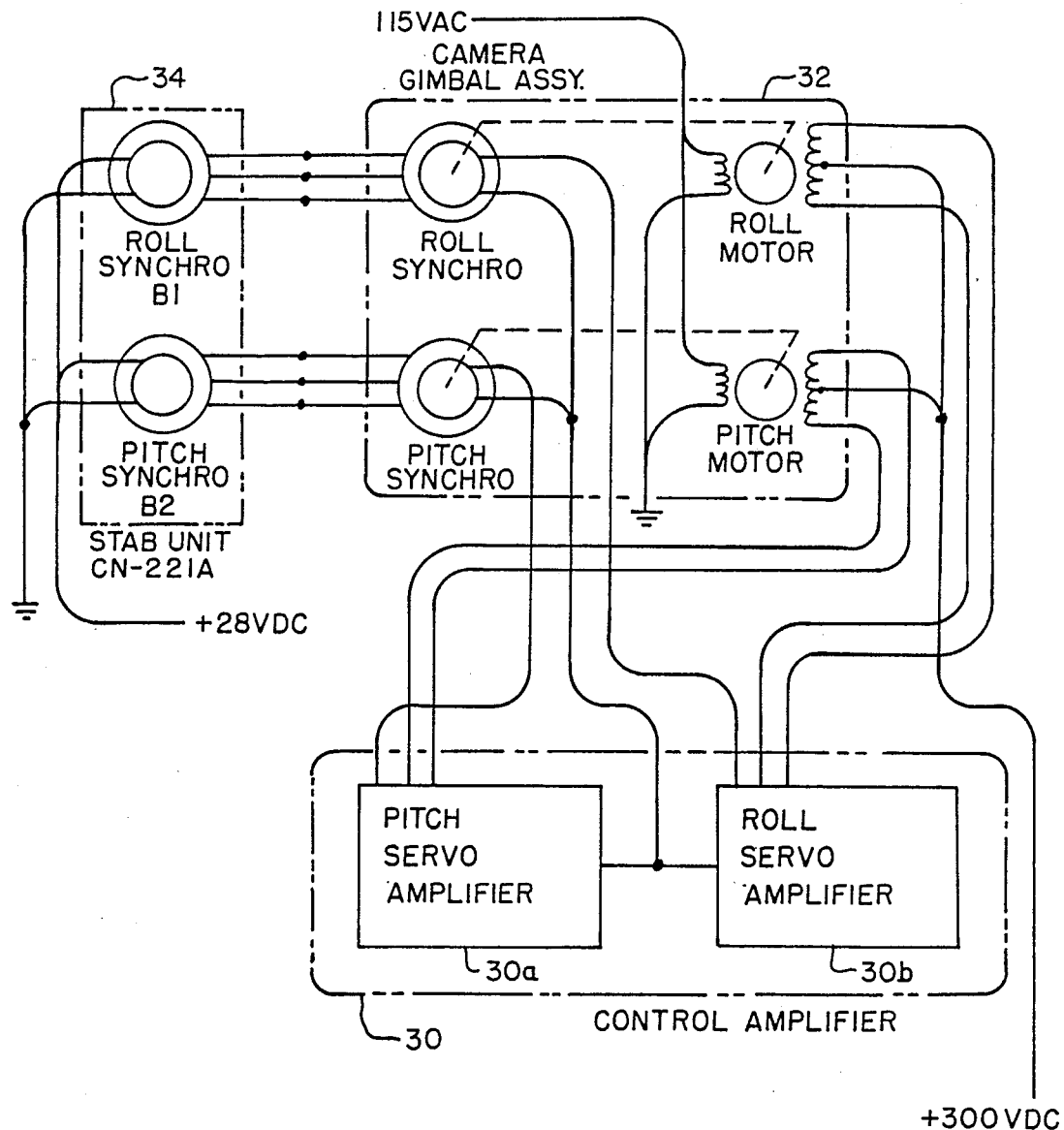
FIG. 2 is a schematic diagram of the video camera stabilization and control circuit.

Turning now to FIG. 2, there is shown a schematic diagram of the stabilization and control system for the video airdrop sight apparatus. The stabilization and control system comprises a control amplifier unit 30, a camera gimbal assembly unit 32, and a stabilization gyro unit 34. The control amplifier unit 30 includes a pitch servo amplifier 30a and a roll servo amplifier 30b. The camera gimbal assembly unit 32 houses the pitch and roll synchro units which respectively cooperate with the pitch (B2) synchro unit and the roll (B1) synchro unit that are located in the stabilization gyro unit 34. The pitch and roll servo amplifiers 30a and 30b which receive null reference signals respectively from the pitch and roll synchro units in the camera gimbal assembly unit 32, respectively provide control signals to the pitch and roll motors to null the respective servo loop. Thus, it may be seen that this synchro null process will maintain the video camera in a stable attitude with respect to the terrain below the cargo aircraft.

Figure 3:
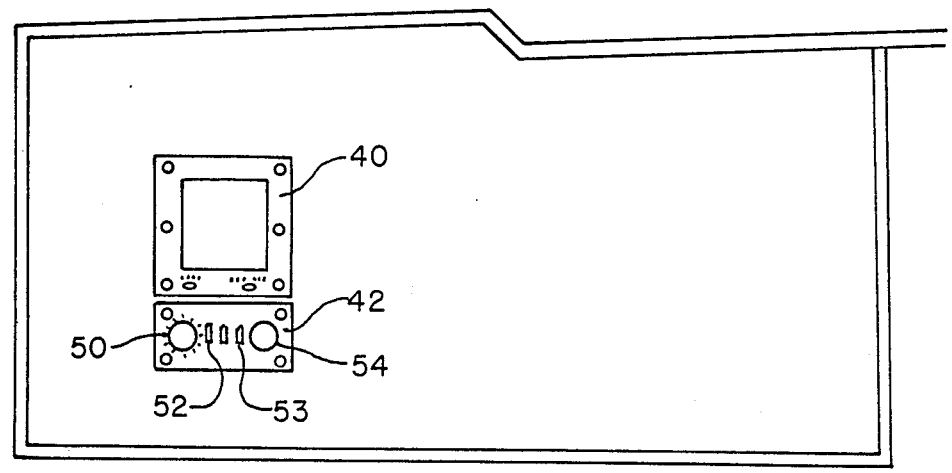
FIG. 3 is a partial pictorial view of the navigator's panel illustrating a typical location of the sight monitor.

Turning now to FIG. 3, there is shown a partial pictorial view of the navigator's panel showing the relative positions of the airdrop sight monitor unit 40 and the aircraft radar scope 44. The airdrop sight monitor is basically a 5 inch diagonal television screen with a vertical and horizontal graticule etched into the face of the screen. The control panel 42 is a switch box with the following controls:

| | |
|---|---|
| ANGLE OF SIGHT, 50 | Sets angle of camera w/respect to horizon on a calibrated scale. |
| PNR ON/OFF, 52 | System power. |
| STAB ON/OFF, 53 | If gyro falls, airdrop can still be made by manually controlling attitude of the aircraft. Camera should lock into place at predetermined angle. |
| CRAB ANGLE, 54 | Corrects camera gimbal about the yaw axis to align target along vertical graticule and correct for Crab angle. |

Although the invention has been described with reference to a particular embodiment, it will be understood to those skilled in the art that the invention is capable of a variety of alternative embodiments within the spirit and scope of the appended claims.

What is claimed is:

1. A video airdrop sight apparatus for cargo aircraft comprising in combination:
   means for visually determining airdrop release points for airdrop cargo, said visual determining means being mounted on a stabilized structure, said stabilized structure operatively connected to said aircraft, said stabilized structure providing position corrections about the pitch and roll axis, and said visual determining means providing a release point signal, said visual determining means comprises in combination:
   means for mounting, said mounting means including a window therein,
   a gimbal frame operatively connected to said mounting means and positioned over said window,
   a video camera operatively connected to said gimbal frame and centered over said window, said video camera generating video signals,
   a roll motor/gimbal point operatively connected to said gimbal frame, said roll motor/gimbal point including a roll synchro,
   a roll gimbal point operatively connected to said gimbal frame and positioned diametrically opposite said roll motor/gimbal point,
   a pitch driver motor operatively connected to said gimbal frame and to said video camera to control the pitch angle of said video camera, said pitch driver motor including a pitch synchro,
   an amplifier unit operatively connected to said roll motor/gimbal point and to said pitch drive motor to adjust the pitch and roll attitude of said video camera, and
   a gyro stabilizer unit operatively connected to said roll synchro and said pitch synchro to provide stabilization signals thereto, and
   means for monitoring signals, said signal monitoring means operatively connected to said visual determining means, said signal monitoring means receiving and displaying said release point signal, said signal monitoring means having fixed calibrated markings on its screen whereby when said release point signal and said calibrated markings are coincident said airdrop cargo is ejected from said aircraft.

2. A video airdrop sight apparatus as described in claim 1 further including a means for controlling, said controlling means operatively connected to said amplifier unit to provide camera sight and angle adjustments.

3. A video airdrop sight apparatus as described in claim 1 further including a means for monitoring video signals, said video monitoring means receiving and displaying said video signals from said video camera.

* * * * *